United States Patent Office 3,472,932
Patented Oct. 14, 1969

3,472,932
FUNGICIDAL METHOD AND COMPOSITION CONTAINING PHOSPHONOTHIONOTHIOLATE DERIVATIVES
Noboru Shindo and Yasukazu Ura, Tokyo, Toru Shimizu, Urawa, Mitsuru Hayakawa, Omiya, and Hiroki Takahashi, Kunihiro Ueda, and Miyako Mori, Tokyo, Japan, assignors to Nissan Kagaku Kogyo Kabushiki Kaisha, Tokyo, Japan, a corporation of Japan
No Drawing. Filed June 14, 1966, Ser. No. 557,382
Claims priority, application Japan, June 14, 1965, 40/35,301; July 8, 1965, 40/40,587; Feb. 3, 1966, 41/5,859
Int. Cl. A01n 9/36; C07f 9/02
U.S. Cl. 424—210                     3 Claims

ABSTRACT OF THE DISCLOSURE

Plant fungicide compositions that contain phosphonothionothiolate derivatives. A method of controlling plant fungi and rice blast disease by applying this composition to the plant surface.

---

The objective of the present invention is to offer an excellent fungicide with which to fight plant diseases. The organic phosphorus compounds according to this invention are highly effective to prevent plant diseases caused by fungi, such as rice blast; sheath blight; leaf rust of barley; anthracnose of melon; black spot of pear. Particularly their effect against rice blast is superior and, moreover, this effect is residual.

Another objective of this invention is to offer a fungicide which possesses low toxicity to mammalia and plants.

The present invention relates to a fungicide characterized by containing one or more of organic phosphorates as expressed by the following general formula:

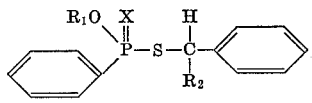

X: sulphur or oxygen
where
$R_1$: lower alkyl radical.
$R_2$: hydrogen or cyano radical or $COOR_3$ radical.
$R_3$: lower alkyl radical.
$R_1$ and $R_3$ may be the same or different and are lower alkyl radical with 1~3 carbon atoms.

The fungicide of the present invention can be easily synthesized by the following reactions.

For the synthesis of the following general formula:

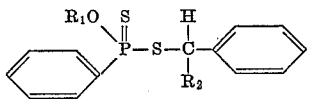

(where $R_1$, $R_2$ are the same as above), the following reaction is employed:

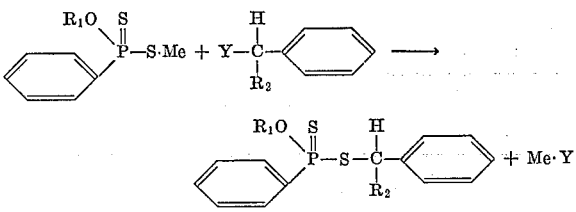

(where $R_1$, $R_2$ are the same as above; Me denotes an alkaline metal such as potassium and sodium or ammonium radical; Y denotes a halogen such as chlorine and bromine.)

For the synthesis of the following general formula:

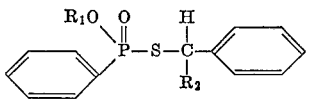

(where $R_1$, $R_2$ are the same as above), the following reaction is employed:

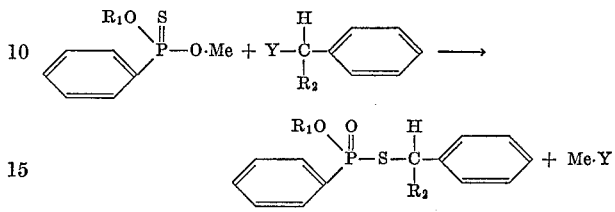

(where $R_1$, $R_2$, Me and Y are the same as above.)
For example, O-alkyl-S-benzylphenylphosphonothiolate of the following general formula:

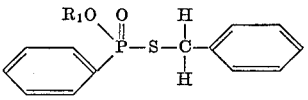

can be synthesized by condensation of potassium O-alkylphenylphosphonothionate with benzylchloride as follows:

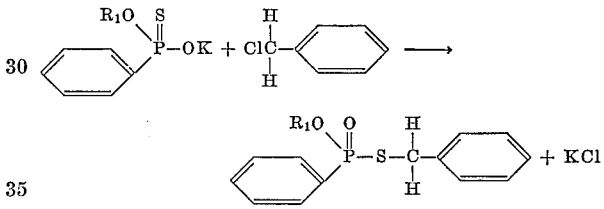

(where $R_1$ is the same as above.)
And O-alkyl-S-(alkoxycarbonyl)(phenyl)methylphenylphosphonothionothiolate as expressed by the general formula:

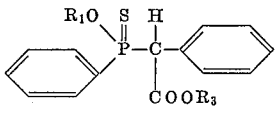

(where $R_1$, $R_3$ are the same as above), can be synthesized through reaction between sodium O-alkylphenylphosphonothionothionate and α-halogenophenylacetic acid alkylester as follows:

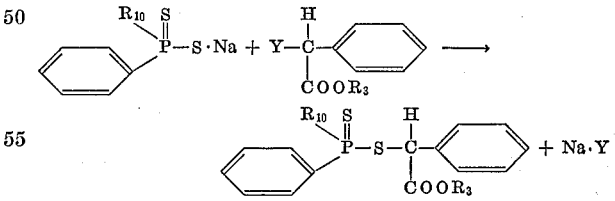

(where $R_1$, $R_3$ and Y are the same as above.)
The typical organic phosphorate which constitute the effective ingredient of the fungicide according to the present invention are as follows:

O-methyl S-(benzyl)phenylphosphonothiolate,
O-ethyl S-(benzyl)phenylphosphonothiolate,
O-ethyl S-(benzyl)phenylphosphonothionothiolate,
O-n-propyl S-(benzyl)phenylphosphonothiolate,
O-methyl S-(cyano)(phenyl)methylphenylphosphonothiolate,
O-methyl S-(cyano)(phenyl)methylphenylphosphonothionothiolate,
O-ethyl S-(cyano)(phenyl)methylphenylphosphonothiolate, O-i-propyl S-(cyano)(phenyl)methylphenylthionothiolate, O-methyl S-(methoxycarbonyl)(phenyl)methylphenylphosphonothiolate, O-methyl S-(ethoxycarbonyl)(phenyl)methylphenylphosphonothiolate, O-ethyl S-(ethoxycarbonyl)(phenyl)methylphenylphosphonothionothiolate, O-n-propyl S-(ethoxycarbonyl)(phenyl)methylphenylphosphonothiolate, O-i-propyl S-(ethoxycarbonyl)(phenyl)methylphenylphosphonothiolate.

To be used as a fungicide, the organic phosphorates in this invention are evenly blended with inert carriers such as talc, clay, kieselguhr and vermiculite in accordance with the routine process; then they may be applied as a dust after being crushed to, say, 300 mesh; or may be mixed with an adjuvant such as a surface active agent or a suspension agent and applied as wettable powder to be diluted with water. Or they may be dissolved in a inert solvent such as toluene or xylene, mixed with some appropriate emulsifying agent; and then applied as emulsion. Or, depending on the necessity, they may be employed in combination with some other fungicide, insecticide, herbicide or fertilizer.

The following illustrates some typical cases of testing the fungicide of this invention.

Test 1.—Pot test for rice blast prevention

The test was carried out as follows.

Rice plant (variety: Aichiasahi, 4~5 leaves stage) cultivated in 15 cm. pot was treated with a water-diluted emulsion of the concentration specified in Table 1, said emulsion being a mixture having the following composition:

40 parts of text compound as listed in Table 1, 50 parts of xylene; and 3 parts of sodiumalkylbenzenesulfonate and 7 parts of polyoxyethylensorbitanmono-oleate as surface active agents. Twenty-four hours after the rice plant was sprayed with said emulsion, a spores suspension of Piricularia oryzae (containing 12~16 spores in ×150 field of microscope) was sprayed on said rice plant for inoculation of spores. Said plant was held for 48 hours at a temperature of 23~28° C. and in dew-wet condition. Thereafter it was left within a green house maintained at about 25° C. After 7 days, the disease rate per leaf was investigated, the average disease rate per leaf was determined and the protective value was calculated.

The investigation was conducted with two upper leaves for each plant. One pot held 20 plants and two pots were tested every time. The investigation averaged about 80 leaves. To determine the disease rate per leaf, the affected degree of the investigated leaves (two upper leaves for each plant) was graded in five: 0 (healthy), 1 (several diseased spots), 2 (spots: 5~10), 3 (numerous spots), and 4 (affected area: over 80%). The average disease rate per leaf was calculated according to the following formula:

Average disease rate per leaf=

$$\frac{0 \times n_0 + 1 \times n_1 + 2 \times n_2 + 3 \times n_3 + 4 \times n_4}{n_0 + n_1 + n_2 + n_3 + n_4}$$

(Where $n_0$: number of leaves rated 0; $n_1$: number of leaves rated 1; $n_2$: number of leaves rated 2; $n_3$: number of leaves rated 3; $n_4$: number of leaves rated 4; $n_0+n_1+n_2+n_3+n_4$: total of investigated leaves.)

Protective value = $\frac{a-b}{a} \times 100$ (where $a$: average disease rate per leaf of control; $b$: that of fungicide-treated plant.)

TABLE 1.—RESULTS OF POT TEST FOR RICE BLAST PREVENTION

| Test compounds | Concentration, p.p.m. | Average disease rate per leaf | Protective value | Damage |
|---|---|---|---|---|
| O-ethyl S-(benzyl) phenylphosphonothionothiolate. | 500 | 0.33 | 78 | Negative. |
| O-ethyl S-(benzyl) phenylphosphonothiolate. | 500 | 0.10 | 93 | Do. |
| O-n-propyl S-(benzyl) phenylphosphonothionothiolate. | 500 | 0.49 | 67 | Do. |
| O-n-propyl S-(benzyl) phenylphosphonothiolate. | 500 | 0.18 | 88 | Do. |
| Control | | 1.50 | 0 | Do. |

Test 2.—Pot test for rice blast prevention as compared with mercury compounds

The test was performed similarly to Test 1 with the same preparation of fungicide as in Example 1.

TABLE 2.—RESULTS OF POT TEST FOR RICE BLAST PREVENTION AS COMPARED WITH MERCURY COMPOUNDS

| Test compounds | Concentration, p.p.m. | Average disease rate per leaf | Protective value | Damage |
|---|---|---|---|---|
| O-methyl S-(benzyl) phenylphosphonothiolate. | 500 | 0.16 | 91 | Negative. |
| Control PMI (phenylmercurie iodide). | [1] 20 | 0.21 | 88 | Do. |
| Control | | 1.80 | 0 | Do. |

[1] As Hg.

Test 3.—Pot test for rice blast prevention similarly to Example 1

Three pots were tested every time. Fungicide was prepared similarly to Test 1.

TABLE 3.—RESULTS OF POT TEST IN TEST 3 FOR RICE BLAST PREVENTION

| Test compounds | Concentration, p.p.m. | Average disease rate per leaf | Protective value | Damage |
|---|---|---|---|---|
| O-methyl S-(cyano)(phenyl) methylphenylphosphonothionothiolate. | 1,000 | 0.07 | 97 | Negative. |
| O-ethyl S-(cyano)(phenyl) methylphenylphosphonothionothiolate. | 1,000 | 0.06 | 98 | Do. |
| O-methyl S-(cyano)(phenyl) methylphenylphosphonothiolate. | 1,000 | 0.08 | 97 | Do. |
| O-ethyl S-(cyano)(phenyl) methylphenylphosphonothiolate. | 1,000 | 0.04 | 98 | Do. |
| Control PMI (Phenylmercurie iodide). | [1] 20 | 0.14 | 94 | Do. |
| Control | | 2.63 | 0 | Do. |

[1] As Hg.

Test 4.—Pot test for rice blast prevention

The test was performed in the same way as in Test 1, but using a fungicide prepared by mixing 40 parts of test compound, 45 parts of xylene and 5 parts of sodiumalkylbenzenesulphonate and 10 parts of polyoxyethylensorbitanmono-oleate as surface active agents and diluting the obtained mixture to the specified concentration.

The results are given in Table 4.

TABLE 4.—RESULTS OF POT TEST IN TEST 4

| Test compounds | Concentration, p.p.m. | Average disease rate per leaf | Protective value | Damage |
|---|---|---|---|---|
| O-methyl S-(ethoxycarbonyl)(phenyl)methylphenylphosphonothiolate. | 1,000 | 0.15 | 95 | Negative. |
| Control (O,O-diethyl S-benzylphosphonothiolate). Do | 1,000 | 0.94 | 72 | Positive. |
| Do | 500 | 1.29 | 61 | Positive-negative. |
| Control | | 3.30 | 0 | Negative. |

Test 5.—Pot test for rice blast prevention

Similar test to Test 1, with the results obtained as shown in Table 5.

TABLE 5.—RESULTS OF POT TEST FOR RICE BLAST PREVENTION IN TEST 5

| Test compounds | Concentration, p.p.m. | Average disease rate per leaf | Protective value | Damage |
|---|---|---|---|---|
| O-ethyl S-(benzyl)phenyl-phosphonothiolate. | 500 | 0 | 100 | Negative. |
| Do | 250 | 0.17 | 91 | Do. |
| Do | 125 | 0.15 | 92 | Do. |
| Do | 63 | 0.47 | 75 | Do. |
| Control | | 1.87 | 0 | Do. |

Test 6.—Pot test for rice blast prevention

Similar test to Test 1, with the results obtained as Table 6.

TABLE 6.—RESULTS OF POT TEST IN TEST 6

| Test compounds | Concentration, p.p.m. | Average disease rate per leaf | Protective value | Damage |
|---|---|---|---|---|
| O-methyl S-(benzyl) phenylphosphonothiolate. | 1,000 | 0.22 | 84 | Negative. |
| Do | 500 | 0.45 | 67 | Do. |
| Control | | 1.35 | 0 | Do. |

Test 7.—Pot test for rice blast prevention

Similar test to Test 1, with the fungicide prepared in the same way as Test 4. The results obtained are given in Table 7.

TABLE 7.—RESULTS OF POT TEST IN TEST 7

| Test compounds | Concentration, p.p.m. | Average disease rate per leaf | Protective value | Damage |
|---|---|---|---|---|
| O-ethyl S-(ethoxycarbonyl)(phenyl)methylphenyl-phosphonothiolate. | 500 | 0 | 100 | Negative. |
| Do | 250 | 0.11 | 94 | Do. |
| Do | 125 | 0.11 | 94 | Do. |
| Do | 63 | 0.22 | 88 | Do. |
| Control | | 1.87 | 0 | Do. |

Test 8.—Pot test on residual effect of fungicide for rice blast prevention

Test was carried out similarly to Test 1, which was executed 24 hours and 48 hours after spraying with spor suspension of *Piricularia oryzae*. The fungicide preparation was the same as Test 4.

TABLE 8.—RESULTS OF POT TEST ON RESIDUAL EFFECT OF FUNGICIDE

| Test compounds | Concentration, p.p.m. | Inoculation, hours later | Average disease rate per leaf | Protective value | Damage |
|---|---|---|---|---|---|
| O-ethyl S-(ethoxycarbonyl) | 250 | 24 | 0.02 | 99 | Negative. |
| Do | 250 | 48 | 0.36 | 85 | Do. |
| Do | 125 | 24 | 0.15 | 94 | Do. |
| Do | 125 | 48 | 0.36 | 85 | Do. |
| Control | | | 2.43 | 0 | Do. |

Test 9.—Field test using rice seedling of rice blast

The test was carried out as follows.

Seed bed 70×90 cm. (dense sown, N-rich) were prepared and sown with rice seeds (variety: Aichiasahi). Beginning on the 10th day of sowing, the plot was sprayed with the fungicide three times (150 cc./plot) every seven days. Thereafter, 30 plants were random-sampled from each plot on the 7th day. The disease rate per plant was investigated; the average disease rate per plant and the protective value were calculated. In this investigation, two plots were tested for each treatment.

The disease rate per plant was graded in six degrees: 0 (healthy), 1 (several diseased spots), 2 (numerous diseased spots), 3 (some top leaves withering on account of 5 (total withering). The average disease rate per plant was calculated as follows:

Average disease rate per plant=

$$\frac{0 \times n_0' + 1 \times n_1' + 2 \times n_2' + 3 \times n_3' + 4 \times n_4' + 5 \times n_5'}{n_0' + n_1' + n_2' + n_3' + n_4' + n_5'}$$

(where $n_0'$: number of diseased leaves rated 0 per plant; $n_1'$: number of diseased leaves rated 1 per plant; $n_2'$: number of diseased leaves rated 2 per plant; $n_3'$: number of diseased leaves rated 3 per plant; $n_4'$: number of diseased leaves 4 per plant; $n_5'$: number of diseased leaves 5 per plant; $n_0'+n_1'+n_2'+n_3'+n_4'+n_5'$ denotes the total number investigated, i.e., equal to 60 plants.)

TABLE 9.—RESULTS OF FIELD TEST USING RICE SEEDLING OF RICE BLAST

| Test compounds | Concentration, p.p.m. | Average disease rate per leaf | Protective value | Damage |
|---|---|---|---|---|
| O-methyl S-(ethoxycarbonyl)(phenyl)methyl-phenylphosphonothiolate. | 1,000 | 2.08 | 42 | Negative. |
| O-ethyl S-(ethoxycarbonyl)(phenyl)methyl-phenylphosphonothiolate. | 1,000 | 2.27 | 37 | Do. |
| Control (O,O-diethyl S-(benzyl) phosphonothiolate). | 1,000 | 2.32 | 36 | Positive-negative. |
| Do | 500 | 3.25 | 10 | Do. |
| Control | | 3.60 | 0 | Negative. |

In the following the present invention is illustrated by examples of application.

Example 1

Emulsion is obtained by mixing the following:

| | Parts |
|---|---|
| O-methyl S-(benzyl)phenylphosphonothionothiolate | 30 |
| Solvent (xylene) | 50 |
| Solvent (acetone) | 10 |
| Surfactant (sodiumalkylbenzenesulphonate) | 3 |
| Surfactant (polyoxyethylenesorbitanmono-oleate) | 7 |

The emulsion is diluted with water for use.

Example 2

Emulsion is obtained by mixing the following:

| | Parts |
|---|---|
| O-ethyl S-(benzyl)phenylphosphonothiolate | 50 |
| Solvent (xylene) | 30 |
| Surfactant (sodiumalkylbenzenesulphonate) | 6 |
| Surfactant (polyoxyethylenesorbitanmono-oleate | 14 |

Example 3

Emulsion is obtained by mixing the following:

| | Parts |
|---|---|
| O-methyl S-(cyano)(phenyl)methylphenylphosphonothionothiolate | 20 |
| Solvent (xylene) | 60 |
| Surfactant (polyoxyethylenesorbitanmono-oleate) | 15 |
| Surfactant (sodiumalkylbenzenesulphonate) | 5 |

Example 4

Emulsion is obtained by mixing the following:

| | Parts |
|---|---|
| O-methyl S-(ethoxycarbonyl)(phenyl)methylphenylphosphonothiolate | 40 |
| Solvent (xylene) | 45 |
| Surfactant (polyoxyethylenesorbitanmono-oleate) | 10 |
| Surfactant (sodiumalkylbenzenesulphonate) | 5 |

Example 5

Wettable powder is obtained by mixing and crushing the following:

| | Parts |
|---|---|
| O-ethyl S-(benzyl)phenylphosphonothiolate | 30 |
| Carrier (clay) | 65 |
| Surfactant (polyoxyethylenenonylphenolether) | 4 |
| Suspension agent (sodiumligninsulphonate) | 1 |

This wettable powder is diluted with water for use.

Example 6

Wettable powder is obtained by mixing and crushing the following:

| | Parts |
|---|---|
| O-ethyl S-(cyano)(phenyl)methylphenylphosphonothionothiolate | 40 |
| Carrier (talc) | 55 |
| Surfactant (polyoxyethylenenonylphenolether) | 4 |
| Suspension agent (sodiumligninsulphonate) | 1 |

This wettable powder is diluted with water for use.

Example 7

Wettable powder is obtained by mixing and crushing the following:

| | Parts |
|---|---|
| O-n-propyl S-(ethoxycarbonyl)(phenyl)methylphenylphosphonothiolate | 40 |
| Carrier (bentonite) | 55 |
| Surfactant (sodiumalkylbenzenesulphonate) | 4 |
| Suspension agent (sodiumligninsulphonate) | 1 |

This wettable powder is diluted with water for use.

Example 8

Dust is obtained by evenly mixing and crushing the following:

| | Parts |
|---|---|
| O-methyl S-(benzyl)phenylphosphonothiolate | 5 |
| Carrier (talc) | 95 |

This dust is applied as it is.

Example 9

Dust is obtained by evenly mixing, crushing and sifting the following through 300 mesh sieve:

| | Parts |
|---|---|
| O-ethyl S-(cyano)(phenyl)methylphenylphosphonothiolate | 3 |
| Carrier (clay) | 30 |
| Carrier (talc) | 67 |

This dust is used as it is.

Example 10

Dust is obtained by evenly mixing and crushing the following:

| | Parts |
|---|---|
| O-ethyl S-(ethoxycarbonyl)(phenyl)methylphenylphosphonothiolate | 3 |
| Carrier (talc) | 97 |

This dust is used as it is.

What is claimed is:

1. A plant fungicide composition comprising a fungicidally effective amount of a compound having the formula

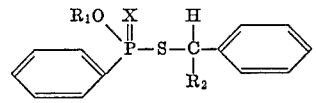

in which $R_1$ represents a lower alkyl, having 1 to 3 carbon atoms, X is selected from the group consisting of sulphur and oxygen, $R_2$ is selected from the group consisting of cyano, and $COOR_3$ in which $R_3$ is a lower alkyl having 1 to 3 carbon atoms and an inert carrier.

2. The method of inhibiting the growth of plant fungi on plants which comprises the step of applying to the plant fungi on said plant a fungicidally effective amount of the composition of claim 1.

3. The method of claim 2 wherein said plant is rice and said plant fungi are rice blast fungi.

References Cited

UNITED STATES PATENTS

| 2,992,265 | 7/1961 | Schrader | 167—30 XR |
| 3,013,047 | 12/1961 | Schrader | 167—30 XR |
| 3,185,723 | 5/1965 | Floyd | 260—941 |

ALBERT T. MEYERS, Primary Examiner

D. R. MAHANAND, Assistant Examiner

U.S. Cl. X.R.

260—940, 941, 961; 424—168, 212, 222, 311, 357